Nov. 30, 1948.     E. L. WOOD     2,455,151
WHEEL TRIM
Filed Sept. 1, 1944     2 Sheets-Sheet 1
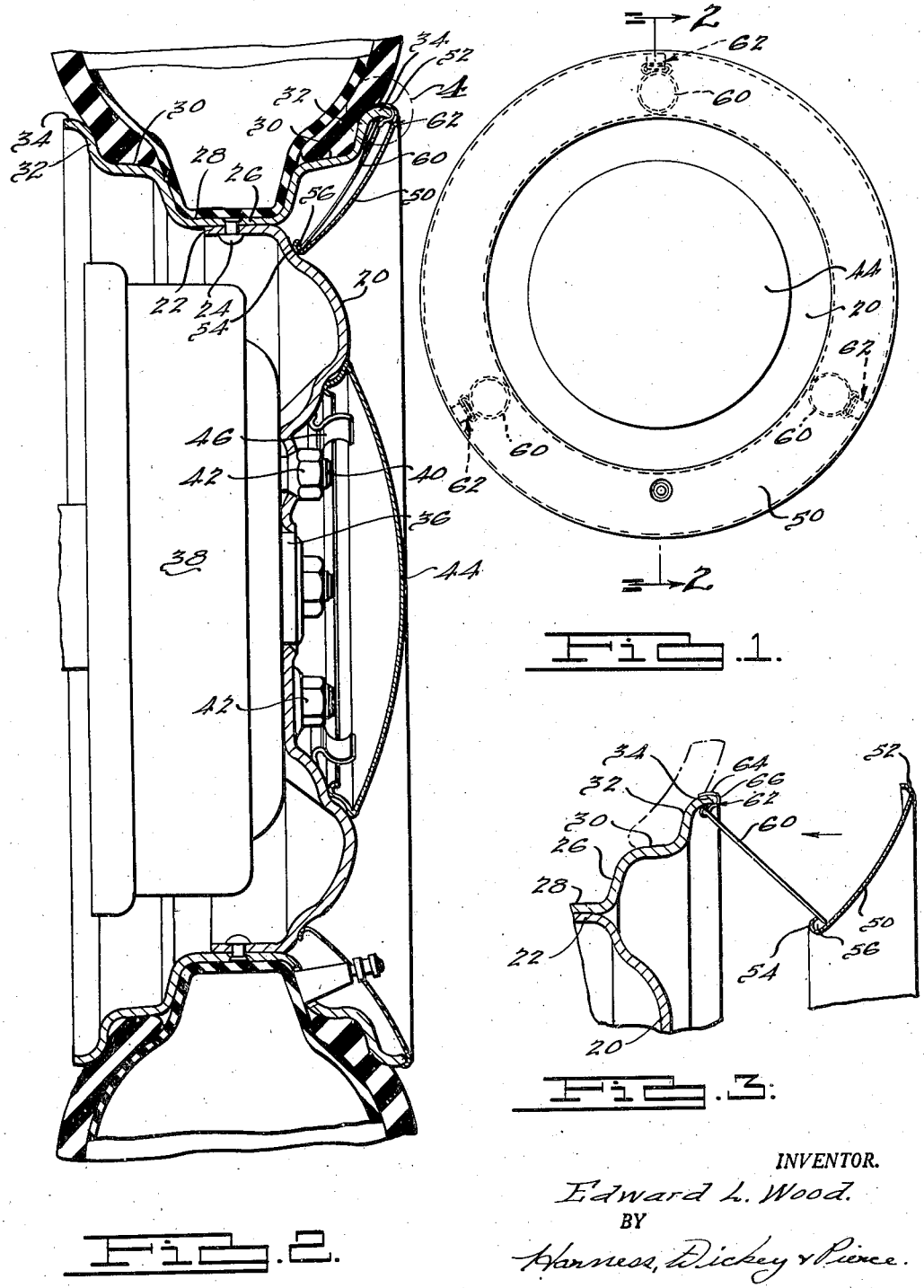
INVENTOR.
Edward L. Wood.
BY
Harness, Dickey & Pierce.
ATTORNEYS.

Nov. 30, 1948. E. L. WOOD 2,455,151
WHEEL TRIM
Filed Sept. 1, 1944 2 Sheets-Sheet 2

INVENTOR.
Edward L. Wood.
BY
Harness, Dickey & Pierce.
ATTORNEYS.

Patented Nov. 30, 1948

2,455,151

UNITED STATES PATENT OFFICE 2,455,151

WHEEL TRIM

Edward L. Wood, Detroit, Mich.

Application September 1, 1944, Serial No. 552,226

11 Claims. (Cl. 301—37)

This invention relates primarily to wheel trim, that is decorative rings or discs applicable to the outer face of automobile wheels to enhance the appearance thereof, the principal object being the provision of an improved type of construction by means of which such rings or discs may be simplified in construction and readily applied to and removed from a cooperating wheel.

Objects of the invention include the provision of a spring mechanism adapted to be carried by an automobile wheel and by the use of which a wheel trim member may be removably secured to the wheel in a simple, secure, and efficient manner; the provision of a construction as above described in which the spring mechanism includes a plurality of spring elements and means are provided for mounting the spring elements on the wheel in a simple, secure, and efficient manner; the provision of a construction as above described in which the means provided for securing the spring elements to the wheel include clips engageable with the lip of the rim of a wheel; the provision of a construction as above described in which the clips are so formed and constructed that when applied to the lip of a wheel rim they will forcefully resist removal therefrom; the provision of a clip as above described including a piece of strip metal bent to embrace opposite sides of the lip of a wheel rim and including a reversely bent end portion providing, and adapted for, biting engagement with said lip to resist removal of the clip from such lip; and the provision of a clip as last described in which the reversely bent end portion is formed to provide an eye serving as a part of a pivotal joint for a spring element.

Further objects of the invention include the provision of a wheel trim ring or cover having a groove on the inner face thereof concentric therewith and opening in a generally radially outwardly direction, together with spring means secured to the wheel and seated in the groove, the spring means being so constructed and arranged that in moving the trim ring or cover axially into operative position with respect to the wheel the spring means are radially compressed and then partially expanded to maintain the trim ring or cover in operative engagement with the wheel; the provision of a construction as above described in which the spring means are pivotally mounted with respect to the wheel rim and their radially inner ends seat in the groove in the trim ring or cover, the spring means serving as toggle mechanisms for releasably securing the trim ring or cover to the wheel; the provision of a construction as above described in which the radially inner end of each spring means is formed on an arc approximating the arc of the bottom of the aforesaid groove whereby to distribute the compressive force on the spring over a material angular extent of the groove; and the provision of a wheel trim ring or cover member formed from moldable material and having an integrally formed portion providing the aforesaid groove for receiving the inner end of cooperating toggle spring elements.

The above being among the objects of the present invention the same consists in certain new and novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a face elevational view of an automobile wheel, minus the tire, provided with a trim ring constructed and secured to the wheel in accordance with the present invention;

Fig. 2 is an enlarged, vertical sectional view taken axially through the wheel shown in Fig. 1 and illustrating a tire in operative relation with respect to the wheel rim, the trim ring being shown in operative position upon the wheel;

Fig. 3 is a fragmentary, sectional view of the outer portion of the wheel and cooperating rim, taken in the same plane as in Fig. 2, illustrating the relative position of the wheel trim ring, and one of the securing springs, relative to the wheel rim, in the positions which they initially assume during the application of the trim ring to the wheel;

Fig. 8 is a view similar to Fig. 6 but illustrating the application of the present invention to a wheel trim of the disc or cover type formed from moldable material such as plastic or the like;

Figures 6, 7:
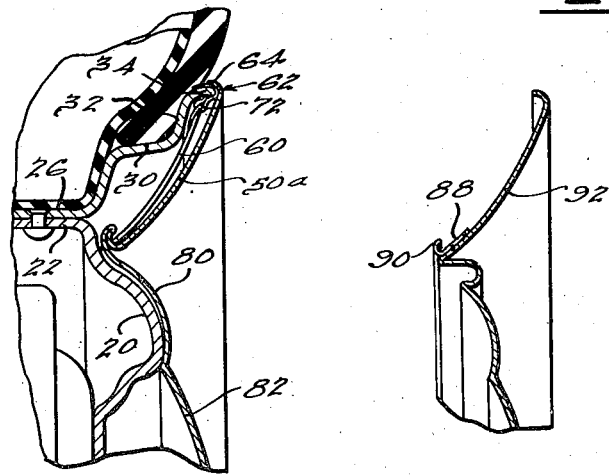
Fig. 6 is a fragmentary, sectional view taken in a plane corresponding to that of Fig. 2 but illustrating a modified form of wheel trim comprising a disc formed from a single sheet of metal.
Fig. 7 is a fragmentary, sectional view taken through another form of trim disc in which the groove or channel is formed by a separate member secured to the disc.
Figure 11:
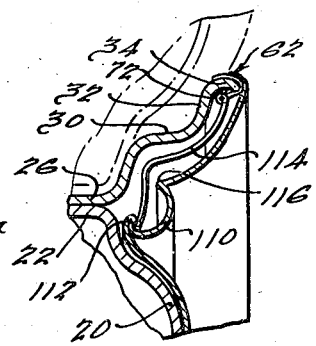
Figure 10:
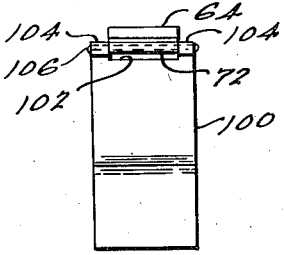

Fig. 10 is a front elevational view of a modified form of spring element which may be employed in place of the spring elements shown in the preceding figures; and, Fig. 11 is a view similar to Fig. 6 but illustrating how the contour of the spring element may be varied to accommodate it to the space between a trim ring or disc and a wheel rim of such cross-sectional conformation as will prohibit the use of a spring which is straight in side elevation.

The present invention in certain respects constitutes an improvement of the construction shown and claimed in my application for Letters Patent of the United States for improvements in wheel trim, filed February 10, 1944, and serially numbered 521,791, now matured into Patent No. 2,394,958, and constitutes a continuation-in-part thereof. In other words it includes an ornamental ring or disc adapted to be applied to the outer face of an automobile wheel in concentric relation with respect thereto and removably secured in place by a plurality of toggle spring elements which are compressed in a generally radial direction until the trim reaches an intermediate axial position of application to the wheel, and which springs are thereafter permitted to partially expand to resiliently hold the trim to the wheel. In my prior patent the toggle spring elements were secured to the wheel trim and the free ends were adapted to engage the radially inner face of the lip at the outer face of the wheel rim, or to engage a corresponding radially directed groove or depression, and thus necessarily required the spring elements to be assembled as a part of the wheel trim. Furthermore it required that the lip on the outer edge of the wheel rim, when employed to receive the free ends of the spring elements, to be bent radially inwardly to a material extent in order to provide a sufficient radially inwardly opening groove or trough in which the free ends of the toggle spring elements might be received without danger of slipping axially outwardly out of contact with the rim. The present invention provides a construction in which the toggle spring elements are secured to the rim itself, and preferably to the lip of the rim, so as to free the wheel trim from permanent connection with the toggle springs, and being operative regardless of the cross-sectional conformation of the lip of the rim.

In accordance with the present invention the toggle spring elements are secured to the lip of the rim by means of a clip structure which may be readily applied to the lip of any existing modern type of rim and to which the spring is pivotally secured. The wheel trim is then provided with radially outwardly, and preferably axially outwardly inclined, concentric groove or channel on its inner face adapted to receive the radially inner ends of the toggle spring elements therein. As in the case of my prior construction above identified the toggle spring elements are secured to the rim in angularly spaced relation with respect to each other about the axis of the rim. The spring elements are of such length that during application of the trim to the wheel the trim is initially positioned in axially outwardly spaced relation with respect to the plane of the lip of the wheel rim and the free ends of the spring elements are seated in the groove of the trim. As the trim is pressed axially inwardly from such initial position the springs are compressed in a general radial direction until the groove lies substantially in the plane of the lip of the wheel, or at least in a plane including the pivotal connections between the spring elements and the wheel, and as soon as the wheel trim is moved axially inwardly from such position to bring the points of contact of the spring elements with the trim axially inwardly of the plane including the pivotal axes of the spring elements on the wheel, the spring elements in tending to expand resiliently and firmly urge the wheel trim axially inwardly into contact with the wheel, thereby removably and resiliently securing the wheel trim in position in contact with the wheel.

The above described changes in my prior construction are of advantage for several reasons. First, by disassociating the spring elements as a permanent part of the wheel trim structure sets of wheel trim rings or discs may be made into smaller packages for shipment than is possible in my prior construction. Furthermore, wheel trim rings or discs may be provided in less disfigured condition than in my prior construction due to the lack of necessity of pivotally securing the spring elements to the ring or disc itself. Also, as previously described it is also applicable to certain types of rim structures which lack sufficient return bending of the lip of the rim to accommodate the free ends as required in my prior construction above identified.

It might be noted that the clip provided in accordance with the present invention and which when combined with the wheel trim of the present invention provides a pivotal connection between the spring elements and the rim and resists removal from the rim through biting engagement with the lip of the rim is, in the broader aspects, applicable to uses other than pivotal supports for spring elements as specifically disclosed herein and it will, therefore, be understood that as far as the broader aspects of the present invention are concerned the clip of the present invention is not restricted to the specific use herein shown and described.

Referring to Figs. 1 to 5, inclusive, the present invention is there shown in connection with a wheel trim in the form of a ring of such radial dimension as to substantially cover the axially outer face of the rim only of the wheel. The particular wheel shown and as best brought out in Fig. 2 is a conventional type of wheel now employed on pleasure automobiles and includes an outwardly bowed body portion 20 having a continuous axially directed peripheral flange or felloe portion 22 upon which is shown seated and secured as by means of rivets 24 a drop center type of rim indicated generally at 26 formed to provide a central channel 28, tire bead seats 30 integrally joined thereto at opposite sides of the channel 28 and the seats 30 terminating in generally radially directed flanges 32 each of which in turn terminates in an axially outwardly directed lip 34. A wheel hub structure indicated generally at 36 is secured to the wheel spindle or axle, as the case may be, and has fixed thereto a conventional brake drum 38 the web of which is provided with a plurality of axially directed studs 40 arranged in a circle concentric with the hub 36. The wheel body 20 is centrally apertured for relatively close reception over the outer end of the hub 36 and for reception of the studs 40, nuts 42 threading on the studs 40 centering and clamping the wheel body 30 with respect to the hub 36. The central depressed portion of the wheel body 20 is covered by conventional hub cap 44 removably secured in position by means of spring elements 46 of conventional construction conventionally secured to the wheel body and conventionally engaging the hub cap 44.

In the construction illustrated in Figs. 1 to 5, inclusive, the wheel trim ring there shown comprises an outwardly bowed sheet metal ring 50 of a diameter slightly greater than the diameter of the wheel rim 26 and having a continuous axially inwardly directed or turned peripheral edge portion 52 adapted to overlie the outer periphery of the axially outer lip 34 of the wheel rim thus to center the ring 50 with respect to the wheel. The ring 50 extends in a radially and axially inwardly direction from the inturned edge 52 and lip 34, into contact with the wheel body 20 in the particular construction shown.

The ring 50, and this applies to the modifications hereinafter shown and described, is provided in radially and axially inwardly spaced relation to the points of connection of the spring elements with the wheel, with means for engaging and releasably retaining the free ends of the spring elements. In the broader aspects of the invention such retaining means may vary widely. For instance, such retaining means may be in the form of tongues, or slots formed directly in the material of the trim for reception of the free ends of the spring elements. On the other hand such retaining means may be formed as brackets or clips of suitable conformation welded or otherwise secured to the trim. Still another form may be a channel, either of intermittent or continuous character, formed either integrally with the trim, or separately therefrom and secured thereto. In any case it will be appreciated that such retaining means should be concentrically disposed with respect to the axis of the trim for balancing purposes. In the drawings the spring retaining means is shown as a continuous channel concentric with the trim, this construction appearing to be preferable at the present time, and in the following specification and claims reference to the spring retaining means as a channel or groove will be understood to be inclusive of the modified forms of spring retaining means hereinabove mentioned.

In the particular case of the trim ring 50 such channel spring retainer is shown as being formed by reversely turning the metal at the radially and axially inner margin of the ring as indicated at 54 so as to form a radially outwardly, opening and preferably axially inclined channel 56 for removably receiving the radially inner or free ends, of the spring elements 60.

Figure 4:
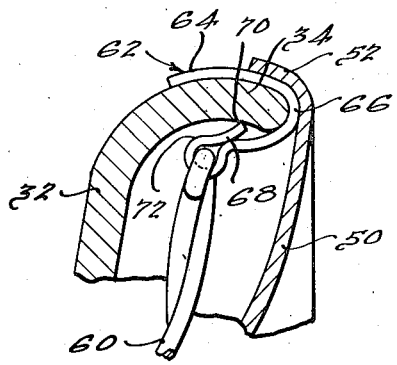
Fig. 4 is an enlarged sectional view taken in the same plane as in Fig. 2 and illustrating in greater detail that portion of the structure shown within the dot-and-dash circle indicated at 4 in Fig. 2.
Figure 5:
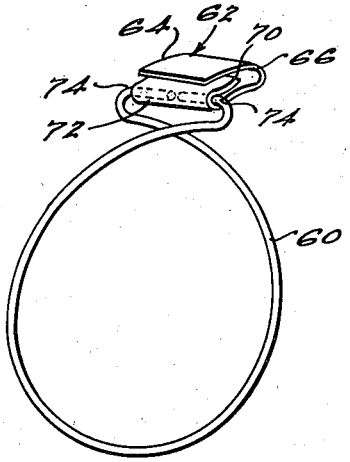
Fig. 5 is an enlarged perspective view of one of the toggle spring and clip assemblies employed in the construction shown in the preceding figures.

The ring 50 is removably secured to the wheel assembly in the construction illustrated in Figs. 1 to 5, inclusive, by means of a plurality of spring elements 60 best shown in Fig. 5. The spring elements 60, three of which are preferably employed but more of which may be employed if desired, are spaced in equally angularly spaced relation about the axis of the wheel, as brought out in Fig. 1, and are pivotally connected by means which will hereinafter be described to the wheel rim at a point adjacent the free edge of the lip 34 at the axially outer side of the wheel. Each spring 60 is of such length from its pivotal axis on the lip 34 to its free end that when in uncompressed state it is of greater length than the distance from its point of pivot on the rim 26 to the bottom of the channel 54 when the trim ring is in operative position with respect to the wheel, as illustrated in Fig. 2, so that the spring elements 50 under such condition are compressed between their pivotal points and the channel 56 and in tending to expand tend to urge the trim ring 50 axially inwardly and, therefore, firmly press it into resilient contacting relation with respect to both the rim 26 and the wheel body 20.

Referring now to Fig. 3 the action of the spring elements 60 will be perhaps more clearly recognized. Fig. 3 illustrates the position of the trim ring 50 at about the time it initially engages the spring elements 60 in the application of the trim ring to the wheel. It will be noted that in this case the trim ring 50 is positioned in concentric relation with respect to the wheel and in axially outwardly spaced relation from its position of final assembly, the spring elements 60 being pivoted to the lip 34 of the rim 26 and their free ends abutting the trim ring 50 in or adjacent to the channel or groove 56 thereof. With the trim ring shown in the position illustrated in Fig. 3, the trim ring in being applied to the wheel is pressed axially inwardly, this movement of the trim ring causing the spring elements 60 to be compressed lengthwise, or in the direction from the channel 56 towards the pivotal axis of each spring element, until the points of contact of the spring elements 60 with the wheel trim 50 become aligned with a plane including the pivotal axes of the various spring elements 60 with the lip 34 of the rim 28, at which time the maximum amount of compression of the spring elements 60 has occurred. Under such conditions, further axial inward movement of the wheel trim ring 50 will move the points of engagement of the free ends of the spring elements 60 therewith axially inwardly of the plane including the pivotal axes of the spring elements 60, and the tendency of the spring elements 60 to expand will produce a component of the compressive force on the spring elements axially of the wheel which will force the wheel trim ring 50 axially into contact with the lip 34 and wheel body 20 in the manner illustrated in Fig. 2 and will resiliently maintain the wheel trim ring 50 in such position. The spring elements thus have a toggle action as will be readily appreciated.

When it is desired to remove the wheel trim ring from the wheel its outer edge may be simply grasped and pulled axially outwardly away from the wheel, the reverse of the above described movements of the parts occurring until the trim ring is entirely free of engagement with the wheel and with the spring elements 60.

It will be observed, as in the case of my prior invention above identified, that when the trim ring is in engagement with the rim and/or the wheel there is a material amount of stress remaining in the spring elements constantly urging the trim ring into closer engagement with the rim and/or wheel which effectively prevents inadvertent disengagement of the wheel trim ring from the wheel during operation, and yet provides a means whereby it may be readily applied and removed as desired without damaging either the trim ring, the wheel or rim, or the means employed for securing the two together.

In the broader aspects of the invention any suitable means may be provided for pivotally mounting the various spring elements 60 on the wheel rim 26 but in accordance with a more limited phase of the present invention this pivotal mounting is effected by means of a clip or bracket of improved construction and operation which may be readily and easily applied to the rim of a wheel but which strongly resists removal therefrom to such an extent as to prevent inadvertent disconnection from the wheel in service. This clip may be adapted for uses other than the pivotal mounting of springs as disclosed herein, as for instance in the securement of balancing weights to wheel rims, but it is particularly adapted for the purposes of the present invention. These clips, and as best brought out in Figs. 4 and 5, and indicated generally at 62, are each formed from a strip of metal into a generally U-shaped conformation with the outer leg of the U, illustrated in Figs. 4 and 5 at 64, of such curvature as to be complementarily received against the radially outer face of the lip 34 of the wheel rim, the base of the U preferably being curved as at 66 for complementary reception of the axially outer curved edge of the lip 34, and the inner edge of the U extending axially inwardly from the free edge of the lip 34 on the radially inner side thereof and its free end portion being radially and axially outwardly bent back upon itself as at 68. The extreme free edge of such reversely bent portion 68 is radially outwardly bent or inclined, toward the opposed leg of the U, so as to present an edge or corner 70 bearing against the radially inner face of the lip 34 and tending to bite into the same. Preferably the clips thus described are formed from spring metal and in their free state the distance between the edge 70 and the portion 64 is less than the thickness of the lip 34 so as to require the clip to be somewhat spread in its application to the lip 34 of the wheel rim. In applying such clips they are simply pressed home over the free edge of the lip 34 and the contracting stress thus set up tends to urge the edge or points 70 into biting engagement with the underside of the lip, which biting engagement effectively resists removal of the clip from the rim.

In the present case where the clip is designed to form a pivotal connection with the spring 60, in being reversely bent as at 68 the inner edge of the clip is also formed to provide an eye 72 for pivotal reception of the radially outer end portion of the spring element 60. In the particular type of spring element shown in Figs. 1 to 5, inclusive, and which is preferable because of its cheapness in manufacture and effectiveness in operation, it consists of a piece of spring wire bent generally into the form of a loop as best brought out in Fig. 5, the free ends of which are extended across each other as brought out in Fig. 5 and are then reversely bent as at 74, the reversely bent ends 74 being opposed to each other and being aligned with each other and pivotally received in the eye 72 of the corresponding clip 62. The springs 60 in free and unstressed condition provide an open loop in which the ends 74 are circumferentially spaced from one another, the loop being closed to permit the insertion of the ends 74 in the eyes 72 of the corresponding clip and being maintained in stressed condition due to the loop being held in closed position by reception of the ends 74 in the corresponding clip 62.

The sides 64 of the clips 62 may be made of such length as to be partially received between the lip 34 of the wheel rim and the cooperating tire as an aid in the holding of the clips to the wheel rim, but I have found that this is unnecessary as the biting engagement of the edge or points 70 effectively prevents disengagement of the clips and the rim. Where the ends 64 are not made of such length as requires deflation of the cooperating tire on the wheel to permit the clips to be forced fully home on the wheel rim, then the application of the clips and consequently the spring elements 60 is considerably facilitated and less time is required for their application.

In Fig. 6 a construction is shown which, except for the trim itself, is identical to that shown in the previous views and consequently all parts except the trim itself are indicated by the same numerals as in the previous views and require no specific description. In the construction illustrated in Fig. 6 the trim is in the form of a disc covering the entire outer face of the wheel and, therefore, eliminates the necessity of using a separate hub cap as in the first described construction. The particular wheel trim shown in this figure includes an outer annular portion 50a which may be identical to the trim ring 50 previously described. The portion 50a is preferably integrally joined at its radially inner margin to an annular portion 80 which extends radially inwardly therefrom and is of a cross-sectional conformation similar to the main body portion of the wheel radially inwardly of the portion 50a and to a point equivalent to the location of the peripheral edge of the hub cap 44 in the first described construction where it is joined to a central disc-like portion 82, preferably formed integrally therewith and which portion 82 is curved to simulate the shape of a normal hub cap. This wheel trim disc is obviously secured in place in the same manner as the wheel trim ring 50 in the first described construction and may be applied to and removed from the wheel in identically the same manner.

In Fig. 7 a wheel trim of the disc type is illustrated in partial section but illustrates a modified form of construction in which, instead of attempting to form the groove or channel for reception of the inner end of the spring elements 60 integral with the trim, such groove or channel is formed by a separate ring member 88 welded or otherwise suitably secured to the inner face of the trim disc and terminating at its radially and axially inner edge in a reversely turned portion 90 providing the groove or channel desired. The trim disc itself which is here illustrated generally at 92 is shown of a modified cross-sectional conformation.

Figure 8:
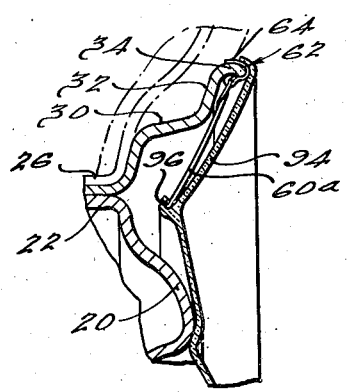
Figure 9:
Fig. 9 is a view similar to Fig. 5, but on a reduced scale, illustrating a preferred form of spring element construction desirably employed with trim rings or discs formed from low strength material, such as the plastic disc or cover shown in Fig. 8.

In Fig. 8 the construction is shown applied to a wheel trim of the disc type formed from a molded material and which may, for instance, be of a plastic composition of a color conforming, if desired, to the color of the paint of the automobile to which the trim is to be applied. The wheel and rim parts together with the clip and rim are identical to those first described and are indicated by the same numerals and no further description of the same is required. The trim disc which is indicated generally at 94 is slightly modified in cross-sectional contour from the construction shown in Figs. 6 and 7 but, of course, may be of any desired cross-sectional contour. In this case it is molded to provide an integral radially outwardly and preferably axially outwardly inclined channel or groove 96 for reception of the inner ends of the spring elements 60a. While the spring element 60a may be identical to those previously shown, preferably and in event the trim disc 94 is formed from a plastic material which is of relatively low strength, then the spring element as illustrated at 60 in Fig. 5 is modified as shown in Fig. 9. In other words and as illustrated in Fig. 9 the radially inner end portion of the spring 60a is curved as at 98 into complementary curvature with respect to the bottom of the groove or channel 96 so that when seated therein a circumferentially extended line of contact is provided between the spring and the trim disc. This type of construction serves to somewhat reinforce the trim disc 94 particularly in the vicinity of the groove or channel 96 against undue distortion because of the stress constantly applied to it, when applied to a wheel, through the spring elements 60a. This type of construction will, of course, operate in identically the same manner as the constructions previously described in applying it to and removing it from the wheel.

It is not to be understood that spring elements of the wire type such as illustrated at 60 in Fig. 6 and 60a in Fig. 9 are necessary for use in connection with the present invention as other suitable types of spring elements may be employed in place thereof. For instance, and referring to Fig. 10, a spring element 100 formed from thin flat sheet metal spring stock is centrally cut away as at 102 at one end to bridge the opposite ends of the eye 72 of a clip 64 and the projecting portions at each side thereof are formed to provide eyes 104 which are adapted to embrace opposite ends of the eye 72, and a pivot pin 106 projected through the eyes 104 of the spring element 100 and through the eye 72 of the clip 62 to pivotally connect the two together. The length of the spring 100 is, of course, commensurate with the length of the spring elements 60 and 60a previously described.

While particularly the springs 60 and 60a have been illustrated as being substantially flat, that is of such nature as to substantially lie in a single plane, it is not to be understood that this feature is essential and may not even be desirable under some circumstances as such springs may be required to be bent in such a manner as to provide them clearance when received between a wheel trim ring or disc and the cooperating wheel rim and/or wheel body. As a matter of illustration, in Fig. 11 in which the same wheel and rim structure as shown in the preceding views is illustrated, the wheel trim in this case is shown as a disc type and including an axially outwardly projecting bead portion 110 intermediate the groove or channel 112 provided for reception of the inner ends of the spring elements 114 and the eyes 72 of the clips received on the lip of the rim. The edges of the bead portion 110 provide an axially inwardly projection 116 on the wheel trim which would prevent the use of a straight spring element 114 and consequently the spring element 114 shown, and which may be of a type corresponding with the spring element 60 or 60a or may correspond to the type of spring elements shown at 100, is so bent in side elevation as shown so as to clear the projection 116.

Other formal changes may, of course, be made in the specific embodiments of the invention described without departing from the spirit or substance of the broad invention, the scope of which is commensurate with the appended claims.

What is claimed is:

1. In combination with an automobile wheel including a rim terminating in a lip at its axially outer edge, a generally circular member adapted for application to said wheel, spring receiving means on said member located radially inwardly of the periphery thereof, and a plurality of angularly spaced spring elements hingedly secured to said rim adjacent said lip thereof and extending in a generally radially and axially inward direction therefrom, the free ends of said springs being received by said means and said spring elements being stressed in a direction to maintain said member in contact with said wheel.

2. In combination with an automobile wheel including a body and a rim, the rim terminating at its axially outer edge in a lip, a wheel trim comprising a circular member concentrically applied to said wheel and substantially engaging said lip of said rim, spring receiving and retaining means on said member positioned axially inwardly of said wheel from said lip of said rim, and spring means hingedly anchored to said rim adjacent said lip thereof and received by said receiving means, said spring means being maintained under compressive force between said receiving means and said point of anchorage with said rim whereby to constantly and resiliently urge said member axially inwardly of said wheel.

3. In combination with an automobile wheel including a body and a rim, a plurality of spring elements circularly arranged about the axis of said wheel in angularly spaced relation with respect to each other and pivotally connected at one end thereof to said wheel, a circular member applied to the outer face of said wheel in substantial contact therewith, said member having a groove on the inner face thereof axially inwardly spaced from the pivotal connections between said spring elements and said wheel, the free ends of said spring elements being received in said groove and said spring elements being maintained under a compressive force between said groove and said points of pivotal connection thereof with said wheel.

4. In combination with an automobile wheel including a rim terminating at its outer axial periphery in a lip, a plurality of clips secured to said lip in angularly spaced relation with respect to each other about the axis of said wheel, a spring element pivotally connected at one end to each of said clips, a wheel trim comprising a circular member peripherally engaging said rim and having a portion located radially and axially inwardly of said lip and provided on its axially inner face with a concentric channel shaped to receive and releasably retain the free ends of said spring elements, the free ends of said spring element being received in said channel and said spring elements being maintained under a compressive force between said channel and said clips.

5. In combination with an automobile wheel including a rim terminating at its axially outer periphery in a lip, a plurality of clips secured to said lip in angularly spaced relation with respect to each other about the axis of said wheel, each of said lips comprising a generally U-shaped spring element embracing said lip therein and having an eye on the radially inner side of said lip, a spring element pivoted at one end to each of said eyes, a wheel trim comprising a circular member peripherally engaging said rim and having a portion located radially and axially inwardly of said lip and provided on its axially inner face with a concentric spring receiving channel, the free ends of said spring element being received in said channel and said spring elements being maintained under a compressive force between said channel and said clips.

6. In combination with an automobile wheel including a rim terminating at its axially outer periphery in a lip, a plurality of clips secured to said lip in angularly spaced relation with respect to each other about the axis of said wheel, each of said lips comprising a generally U-shaped spring element embracing said lip therein and having an eye on the radially inner side of said lip, the radially inner portion of said clip being reversely bent and provided with a free edge for biting engagement with said lip, a spring element pivoted at one end to each of said eyes, a wheel trim comprising a circular member peripherally engaging said rim and having a portion located radially and axially inwardly of said lip and provided on its axially inner face with a concentric spring receiving groove, the free ends of said spring element being received in said groove and said spring elements being maintained under a compressive force between said groove and said clips.

7. In combination with an automobile wheel having a rim terminating at its outer axial periphery in a lip, a plurality of clips secured to said lip in angularly spaced relation with respect to each other about the axis of said wheel, each of said clips including an eye located on the radially inner side of said lip in approximately parallel relation with respect to that portion of the lip embraced thereby, a loop-like spring element having free ends arranged in opposed and approximately parallel relation with respect to each other, said ends of each of said spring elements being received in the eye of a corresponding clip, a wheel trim comprising a generally circular member concentric with said wheel on the axially outer side thereof and engaging said clips, said member extending radially and axially inwardly of said wheel from said lip and radially and axially inwardly from said eyes presenting concentric spring receiving means on the inner face thereof, the free ends of said spring elements being received in said receiving means and said elements being maintained under a compressive force between said receiving means and said clips.

8. In combination with an automobile wheel having a rim terminating at its outer axial periphery in a lip, a plurality of clips secured to said lip in angularly spaced relation with respect to each other about the axis of said wheel, each of said clips including an eye located on the radially inner side of said lip in approximately parallel relation with respect to that portion of the lip embraced thereby, a loop-like spring element having free ends arranged in opposed and approximately parallel relation with respect to each other, said ends of each of said spring elements being received in the eye of a corresponding clip, a wheel trim comprising a generally circular member concentric with said wheel on the axially outer side thereof and engaging said clips, said member extending radially and axially inwardly of said wheel from said lip and radially and axially inwardly from said eyes presenting concentric spring receiving means on the axially inner face thereof, the free ends of said spring elements being received in said receiving means and said elements being maintained under a compressive force between said receiving means and said clips, the free ends of said spring elements being curved into approximately complementary curvature to that portion of said spring receiving means with which they lie in contact.

9. The combination of a spring element assembly for use in connecting a wheel trim member to an automobile wheel and an automobile wheel having a rim terminating at its outer axial periphery in a lip comprising a generally U-shaped clip formed to resiliently embrace the lip of a wheel rim therein, a reversely bent end on one leg of said clip the free end portion of which is bent away from said leg and toward the other leg of said clip whereby to provide an edge for biting engagement with said lip of said rim, and a spring element pivotally secured at one end thereof to said reversely bent end of said clip.

10. The combination of a spring element assembly for use in securing a wheel trim member to an automobile wheel and an automobile wheel terminating at its axially outer periphery in a lip comprising a generally U-shaped metallic clip formed from spring metal, the end portion of one of the legs of said member being reversely bent upon itself to form a terminal eye on said leg and the free end thereof lying within said U, said free end being bent upwardly away from the corresponding said leg to provide an edge for biting engagement with said lip, the distance between said edge and the opposite leg of said U when said clip is in unstressed condition being less than the thickness of said lip to which said clip is adapted to be applied, and a spring element pivotally connected at one end to said clip through said eye.

11. The combination of a clip adapted for securement to the lip of an automobile wheel rim and an automobile wheel having a rim terminating at its outer axial periphery in a lip comprising a generally U-shaped member formed from a strip of spring metal, the metal at the end of one of the legs being reversely bent upon itself to within said U and the free end portion thereof being bent upwardly away from the corresponding of said legs toward the opposite of said legs whereby to provide an edge for biting engagement with said lip, the normal free distance between said edge and the opposite leg of said U being less than the thickness of a lip to which said clip is adapted to be applied.

EDWARD L. WOOD.

REFERENCES CITED

The following references are of record in the file of this patent:

UNITED STATES PATENTS

| Number | Name | Date |
|---|---|---|
| 1,139,627 | Baltzley | May 18, 1915 |
| 2,224,972 | Long et al. | Dec. 17, 1940 |
| 2,239,367 | Lyon | Apr. 22, 1941 |
| 2,279,331 | Lyon | Apr. 14, 1942 |
| 2,286,988 | Jones | June 12, 1942 |
| 2,351,655 | Aske | June 20, 1944 |